United States Patent [19]
Herborn

[11] Patent Number: 6,071,162
[45] Date of Patent: Jun. 6, 2000

[54] METHOD AND DEVICE FOR SEPARATING CAPS FROM GAS DISCHARGE LAMPS

[76] Inventor: Paul Herborn, Nonnenwaldweg 3, D-65388 Schlangenbad, Germany

[21] Appl. No.: 09/125,498

[22] PCT Filed: Feb. 26, 1997

[86] PCT No.: PCT/EP97/00918

§ 371 Date: Nov. 18, 1998

§ 102(e) Date: Nov. 18, 1998

[87] PCT Pub. No.: WO97/32332

PCT Pub. Date: Sep. 4, 1997

[30] Foreign Application Priority Data

Feb. 28, 1996 [DE] Germany ............................ 196 07 482

[51] Int. Cl.[7] .................................................... H01J 9/50
[52] U.S. Cl. .................................................. 445/2; 445/61
[58] Field of Search ............................................ 445/2, 61

[56] References Cited

U.S. PATENT DOCUMENTS 2,304,714  12/1942  Stringer ........................................ 445/2
4,715,838  12/1987  Kulander ..................................... 445/61

FOREIGN PATENT DOCUMENTS 0 157 249 A1  10/1985  European Pat. Off. ........... H01J 9/50
0 200 697 A2  11/1986  European Pat. Off. ........... H01J 9/00

*Primary Examiner*—Michael H. Day
*Assistant Examiner*—Todd Reed Hopper
*Attorney, Agent, or Firm*—Limbach & Limbach L.L.P.

[57] ABSTRACT

A method and apparatus for separating caps from gas discharge lamps which include a hollow cylindrical glass tube body and a cap at each end of the tube body. A break-off line is formed near each end of the tube body, and the caps are then removed from the lamps by venting and blowing-off the ends of the gas discharge lamp in a single working operation by directing a plasma flame of a plasma nozzle towards each break-off line and burning a hole in the lamp. The discharge flow of gas from the plasma nozzle flows through the hole produced in the lamp into the interior thereof and the gas pressure blows off the ends of the gas discharge lamp with the caps.

10 Claims, 1 Drawing Sheet

METHOD AND DEVICE FOR SEPARATING CAPS FROM GAS DISCHARGE LAMPS

FIELD OF THE INVENTION

The invention relates to a process and an apparatus for removing caps from gas discharge lamps which include a hollow cylindrical glass tube body and a cap at each end of the tube body.

BACKGROUND OF THE INVENTION

In a known process and apparatus of that kind (described in U.S. Pat. No. 4,715,838) a hole is mechanically bored into the lamp socket or cap in order to vent the interior of the gas discharge lamp, the tube body is scratched mechanically adjacent to the caps and then the two scratch lines are heated by a pair of simple gas flame burners so as to crack the glass along each scratch line, by virtue of the heat shock. A procedure of that kind is effective but it is time-consuming.

It is also already known to burn an opening in the discharge casing or tube by means of a simple gas flame in order to vent the discharge tube (DE 34 10 989 A1; JP 52-94674 in: Patents Abstracts of Japan, sect. E 1977; Reimer, Buchard 'Recylinganlage und Verfahren zur Vertwertung von quecksilberhaltigen Entladungslampen' (translation: Recycling installation and process for making use of mercury-containing discharge lamps) in: Licht 3-4/1994, pages 296–302). That procedure is time-consuming.

It is also known (DE 38 42 888 A1) for the lamp ends to be heated by an annular burner and then quenched with a cold body in order to remove the lamp ends. That is time-consuming.

Those known cap removal processes are therefore time-consuming to implement, so that the through-put of gas discharge lamps to be disposed of is correspondingly low.

SUMMARY OF THE INVENTION

An object of the present invention is therefore to develop an apparatus for removing caps from gas discharge lamps, such that the through-put of gas discharge lamps which are to be disposed of and reprocessed can be considerably increased.

In accordance with the invention a lamp end separation device is provided for burning a hole in the glass tube body at a predetermined location by means of an electrically producible plasma flame. It is possible to vent and remove the caps from about 5000 gas discharge lamps per hour.

Desirably, desired-rupture locations (break-off lines) on the gas tube body for cap removal are made by a procedure whereby the glass tube body is heated in the proximity of the caps. For that purpose the heating device has a pair of heating wires which extend at a spacing from each other in parallel relationship and over which the gas discharge lamps roll with the help of the drive device. In that way each gas discharge lamp is heated and melted at its periphery at the locations of which the caps are to be removed. Instead of the heating wires it is possible to use heating wire loops into which the glass tube rolls or into which the glass tube is lifted or inserted by means of an automatic mechanism. Besides thermally producing the break-off lines on the glass tube body, it is also possible to envisage using a hard tool, for example a hard metal or carbide metal wheel, a scratching tool or chisel, or the like, in order to scratch the break-off lines in the glass tube body, in the proximity of the caps.

A relatively short time for burning venting holes into the glass tube body is achieved by using a plasma flame which can be ignited by high-frequency voltage. The high-frequency voltage is applied to the lamp end separation device which has a nozzle and a counterpart electrode. The counterpart electrode is advantageously of a cylindrical configuration. The high-frequency voltage which is applied between the counterpart electrode and the nozzle ignites an arc for forming a plasma flame. The counterpart electrode is at least partially arranged within and at a predetermined axial spacing with respect to the nozzle. Compressed air flows along the cylindrical counterpart electrode serving as a coolant and out of the nozzle forming part of the plasma-producing gas. In that way the plasma flame is blown out of the nozzle by means of compressed air. The discharge flow speed of the compressed air through the nozzle is so high that it produces a suction effect which so-to-speak additionally pulls the plasma flame out of the nozzle. In that way, an extremely hot plasma flame which can be focussed on to a given location on the glass tube for burning a hole therein can be produced within a very short time. The lamp end separation device or nozzle is arranged at a predetermined distance from the path of the gas discharge lamps which can be moved past the device at a predetermined spacing above the nozzle. Preferably the nozzle is disposed about 3 mm beneath the gas discharge lamps which are to be moved therepast. It will be appreciated that it is possible for the removal device also to be arranged laterally of, or above, the gas discharge lamps to be disposed of. In order to optimize the cap removal rate and thus the through-put rate of gas discharge lamps to be disposed of, the switch-on time and the duration of the plasma flame are determined under computer control. Alternatively the time at which the plasma flame is switched on can be established by means of a proximity switch or by means of a mechanical switch.

BRIEF DESCRIPTION OF THE DRAWINGS

The invention is described in greater detail hereinafter by means of an embodiment which reference to the accompanying drawings in which.

DETAILED DESCRIPTION OF AN EMBODIMENT

Figure 1:
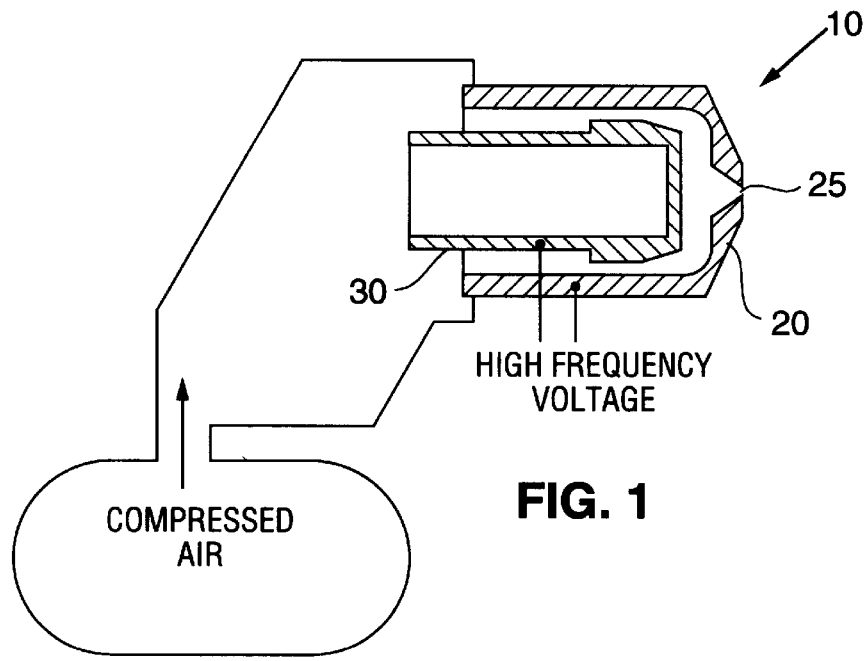
FIG. 1 shows a view in longitudinal section of a removal device according to the invention which has a nozzle and a counterpart electrode.
Figure 3:
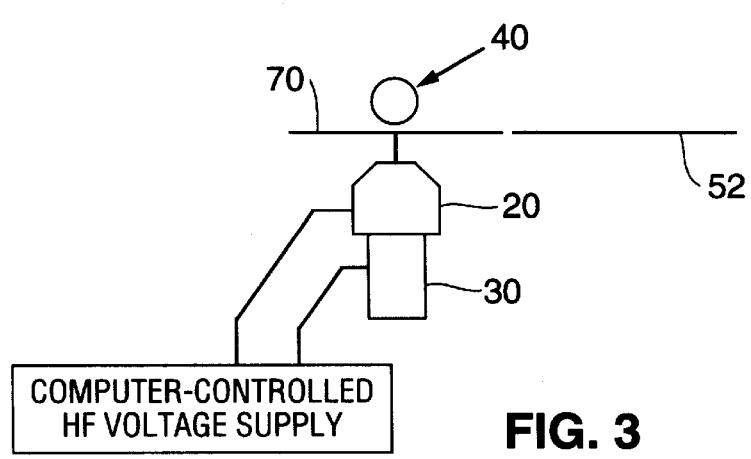
FIG. 3 shows a simplified diagrammatic view of the apparatus according to the invention, with the removal device shown in FIG. 1.

Referring to FIGS. 1 and 3, lamp end separation device 10 (shown in longitudinal section in FIG. 1) can burn a hole into a glass tube body 40 at a predetermined location, by means of a plasma flame which can be produced electrically. The separation device 10 preferably includes a nozzle 20 for burning that hole. The hole burner nozzle 20 functions to constrict the plasma arc or plasma flame. In that way the plasma flame can be focussed onto a small region on the glass tube body 40. For that purpose, the nozzle 20 has a region of relative large inside diameter, said region being remote from an outlet opening 25. The inside diameter is almost constant for that region. The front part of the nozzle 20 extends in a conical configuration along the longitudinal axis and finally forms the outlet opening 25. A counterpart electrode 30 is of a cylindrical configuration and has an opening at one end. The outside surface of the side which is remote from the opening 25 of the counterpart electrode 30 extends in a conical shape in the longitudinal direction so that in that way the incoming flow of compressed air can be guided in a direction towards the outlet opening 25 of the nozzle 20. The dimensions of the counterpart electrode are so selected that it can be arranged approximately coaxially with respect to the nozzle 20. As shown in FIG. 1 the counterpart electrode 30 is arranged at least partially within and at a predetermined axial spacing from the nozzle 20. To produce the plasma flame or the plasma arc, a high-frequency voltage is applied between the counterpart electrode 30 and the nozzle 20 (by a voltage supply), the voltage functioning as an ignition voltage. In order to be able to focus the plasma flame produced, on to a predetermined location on the glass tube body 40, compressed air is passed over the counterpart electrode 30 or between the counterpart electrode 30 and the nozzle 20, and can thereafter flow out of the outlet opening 25. The high discharge flow speed of the compressed air causes a suction action in the interior of the nozzle 20 so that the plasma flame is not only blown out of the nozzle 20 but is also pulled out, with the suction effect of the compressed air.

Figure 2:
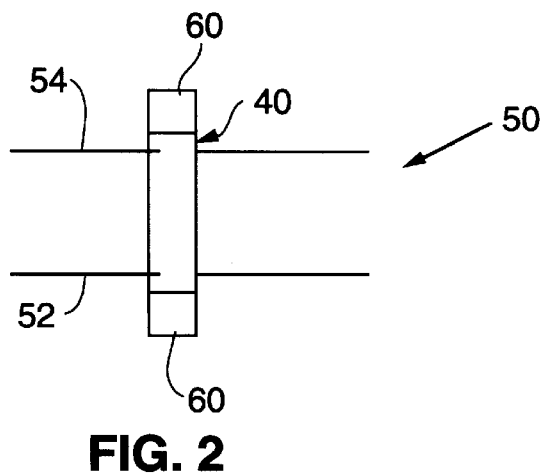
FIG. 2 shows a simplified diagrammatic view of the heating device.

So that the caps 60 which laterally close off the glass tube body 40 can be separated off or removed at desired-rupture locations, there is provided a heating device 50 which is shown in FIG. 2 and which has a pair of heating wires 52, 54 extending at a spacing from each other in parallel relationship. The heating wires are preferably made from a nickel-chromium alloy. The wire diameter is about 2 mm. A sufficient heating temperature is achieved if the heating wires 52, 54 are operated at a range such that they glow yellow, that is to say if approximately a current of 50 A flows therethrough. It should be pointed out that the heating current is naturally adjustable. A drive device (not shown) provides that each gas discharge lamp rolls over the heating wires 52, 54, under a predetermined pressure (see FIG. 2). That procedure causes the glass tube body 40 to be uniformly heated at its periphery, along two desired-rupture locations (break-off lines).

The lamp end separation device 10 according to the invention is disposed downstream of one of the heating wires 52, 54, in the direction of conveying movement of the gas discharge lamps. The lamp end separation device 10 is arranged laterally of and below an indicated conveyor belt 70. Advantageously, the hole burner nozzle 20 is disposed about 3 mm beneath each gas discharge lamp which is in position to be treated. That situation is shown in FIG. 3. After the gas discharge lamp has rolled over the heating wires 52, 54, it is stopped directly over the hole burner nozzle 20. Positioning of the gas discharge lamp over the separation device 10 is effected with computer aid. As soon as the gas discharge lamp is positioned above the nozzle 20 the high-frequency voltage is applied to the counterpart electrode 30 and the nozzle 20, to fire the plasma flame. Compressed air is caused to flow by way of a compressor (not shown) over the counterpart electrode 30 to the outlet opening 25 of the nozzle 20. The compressed air flows out through the outlet opening 25 and, in conjunction with the nozzle 20, focuses the plasma flame onto a predetermined point on the glass tube body 40. The plasma flame burns a hole in the glass tube body 40, in a very short time of about 200 ms. Because of the pressure difference between the evacuated glass tube 40 and the atmospheric pressure, the glass tube is vigorously vented in such a way that it is cracked at the break-off lines thereof, i.e. the caps are separated off or removed at the break-off lines from the remaining glass tube 40. The choice of the optimum plasma flame switch-on time and the duration of the plasma flame, being the period during which it is directed on to the gas discharge lamp, can be implemented under computer control of the voltage supply.

By virtue of the apparatus according to the invention it is possible to vent about 5000 gas discharge lamps per hour.

What is claimed is:

1. A process for removing caps from gas discharge lamps, each having a hollow cylindrical glass tube body and a cap at each end of the cylindrical glass tube body, including the steps of:

a) supplying gas discharge lamps in a succession to a processing station;

b) venting each gas discharge lamp at the processing station;

c) producing a break-off line around the cylindrical glass tube body of each gas discharge lamp near each end thereof adjacent to a respective one of the caps, each said break-off line determining a desired-rupture location; and d) cracking off the ends of each gas discharge lamp together with its caps;

wherein the steps of venting and cracking off of the ends of the gas discharge lamps are effected in a single working operation by producing a plasma flame with a gas flow from a plasma nozzle which is directed towards each said gas discharge lamp, and a hole is burnt into the glass tube body of each said gas discharge lamp so that said flow of gas from said plasma nozzle flows through said hole produced in the gas discharge lamp into the interior thereof and gas pressure is generated in said interior which assists in cracking off the ends of the gas discharge lamp together with the caps.

2. A process as set forth in claim 1, wherein each said break-off line is produced by peripherally contacting the ends of each of the gas discharge lamps against a pair of heating wires.

3. A process as set forth in claim 2, wherein said gas discharge lamps roll along said heating wires when being successively supplied to said processing station.

4. A process as set forth in claim 2, wherein said pair of heating wires form heating loops along which said peripheral contact operation is made.

5. A process as set forth in claim 1, wherein said break-off lines are scratched in each of said gas discharge lamps around the periphery thereof at said lamp ends by means of a hard material tool.

6. A process as set forth in claim 1, wherein said plasma flame is produced in response to a high-frequency field which is switched on and off for making said plasma flame effective and ineffective, respectively.

7. An apparatus for removing caps from gas discharge lamps which include a hollow cylindrical glass tube body, and a cap at each end of the cylindrical body, the apparatus comprising:

means for supplying the gas discharge lamps in succession to a processing station;

means for producing break-off lines around the glass tube body of each of the gas discharge lamps being supplied each of the break-off lines adjacent to a respective cap; and means for venting the glass tubes and removing said caps from said gas discharge lamps, wherein said means for venting the glass tubes and removing said caps comprises a plasma nozzle having an outer nozzle body and an inner counterpart electrode, and a high-frequency voltage supply connected between the nozzle body and the counterpart electrode, said plasma nozzle being arranged downstream of said means for producing break-off lines and wherein said plasma nozzle is adapted to produce an electrically generated plasma flame and the electrically generated plasma flame is alignable to the glass tube of each of the gas discharge lamps so as to burn a hole therein and to direct discharging gas into said glass tube thereby cracking off the ends of said each of the gas discharge lamps together with the caps.

8. The apparatus set forth in claim 7, wherein said counterpart electrode is arranged within the nozzle body and said counterpart electrode is of a generally cylindrical configuration defining a generally annular space between the nozzle body and said counterpart electrode, and wherein the high-frequency voltage supply is a controllable high-frequency voltage generator.

9. The apparatus set forth in claim 8, also including a means for supplying compressed air to said annular space which is effective to blow out said plasma flame from the nozzle.

10. The apparatus set forth in claim 9, wherein said high frequency voltage supply is a computer-controlled voltage supply adapted to be switched on and off for controlling the switch-on times and the duration of burning of the plasma flame.

* * * * *